United States Patent
Kabumoto et al.

(10) Patent No.: US 7,859,218 B2
(45) Date of Patent: Dec. 28, 2010

(54) POWER SOURCE SYSTEM

(75) Inventors: Hiroki Kabumoto, Saitama (JP);
Daisuke Takahashi, Hyogo (JP);
Takashi Yasuo, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 719 days.

(21) Appl. No.: 11/905,232

(22) Filed: Sep. 28, 2007

(65) Prior Publication Data

US 2008/0079386 A1   Apr. 3, 2008

(30) Foreign Application Priority Data

Sep. 29, 2006  (JP) ............................. 2006-269339
Jun. 29, 2007  (JP) ............................. 2007-171330

(51) Int. Cl.
*H01M 10/44*  (2006.01)
(52) U.S. Cl. ................. 320/101; 320/138; 136/291; 136/293; 323/906
(58) Field of Classification Search ............ 320/101
See application file for complete search history.

(56) References Cited

U.S. PATENT DOCUMENTS

| | | | |
|---|---|---|---|
| 2004/0067396 A1* | 4/2004 | Bloch et al. | 429/20 |
| 2004/0183501 A1* | 9/2004 | Ozeki | 320/101 |
| 2006/0024564 A1* | 2/2006 | Manclaw et al. | 429/46 |

FOREIGN PATENT DOCUMENTS

| | | |
|---|---|---|
| JP | 2002-252014 | 9/2002 |
| JP | 2004-362811 | 12/2004 |

* cited by examiner

*Primary Examiner*—Edward Tso
*Assistant Examiner*—Yalkew Fantu
(74) *Attorney, Agent, or Firm*—McDermott Will & Emery LLP

(57) ABSTRACT

A power source system to be mounted in electrical devices is provided. The power source system includes a fuel cell which supplies electric power generated by consuming fuel, a fuel storage portion which stores the fuel and supplies the fuel to the fuel cell, a container which contains the fuel cell and the fuel storage portion, and a case which is provided so as to surround the container. A space for allowing air used for the reaction in the fuel cell to circulate therethrough is provided between the container and the case.

15 Claims, 15 Drawing Sheets

POWER SOURCE SYSTEM

CROSS-REFERENCE TO RELATED APPLICATIONS

This application is based upon and claims the benefit of priority from both the prior Japanese Patent Application No. 2006-269339, filed Sep. 29, 2006 and the prior Japanese Patent Application No. 2007-171330, filed Jun. 29, 2007, the entire contents of which are incorporated herein by references.

BACKGROUND OF THE INVENTION

1. Field of the Invention

The present invention relates to a technology for a power source system for supplying power to a device, and in particular, to a technology for a power source system provided with a fuel cell.

2. Description of the Related Art

Fuel cells are devices for generating electrical energy from fuel and oxidant and are capable of providing high power generation efficiency. One of the main features of fuel cells is that electric power is generated through direct power generation, in contrast to conventional power generation methods in which electric power is generated via a thermal or kinetic energy process. Therefore, small-scale fuel cells can also be expected to provide high power generation efficiency. Furthermore, since fuel cells discharge less nitrogen compounds and the like and generate less noise and vibration, the negative influence on the environment can be reduced. As mentioned above, since fuel cells can effectively utilize the chemical energy contained in fuel and have environmentally friendly characteristics, they are expected to serve as energy supply systems in the 21st century. Therefore, fuel cells have received attention as promising new power generation systems usable in portable devices, automobiles, space devices, and the like, i.e., usable in various power generation applications from small to large scale. Thus, the technological development of fuel cells for practical use is in full progress.

Among the various types of fuel cells, polymer electrolyte fuel cells are characterized by lower operational temperatures and higher power densities than other types of fuel cells. A direct methanol fuel cell (hereinafter abbreviated as "DMFC") is a form of polymer electrolyte fuel cell and has received particular attention in recent years. In the DMFC, methanol serving as fuel is directly supplied to an anode without modification to obtain electric power through the electrochemical reaction of the methanol with oxygen. In this electrochemical reaction, carbon dioxide serving as a reaction product is discharged from the anode, and product water serving as a reaction product is discharged from the cathode. As compared to hydrogen, methanol has higher energy per unit volume, is suitable for storage and easy to handle. Thus, DMFCs are expected to be employed as a power source for automobiles, portable devices (such as cellular phones, notebook type personal computers, PDAs, MP3 players, digital cameras, and electronic dictionaries (books)), and the like.

Techniques for replacing conventional dry batteries with such fuel cells have been proposed. For example, a fuel cell is known which is composed of an inner case for containing the fuel cell and a plastic or metal outer case provided outside the inner case and having the same shape as a general-purpose chemical battery.

Moreover, a power source system is known which is configured such that the output voltage of the power generation module thereof for generating power using fuel varies with time in a manner corresponding to the discharge characteristics of conventional voltaic batteries.

Meanwhile, oxidant such as air must be stably supplied to a fuel cell. When air supply is not stable or air is deficient, the output characteristics of the fuel cell are unstable. In particular, when a fuel cell is used as a substitute for a dry battery used in various devices, the area around the air electrode (cathode) of the fuel cell mounted on a device of a particular type is not always in an open state. As described above, a fuel cell having the same shape as a D size dry battery has been known. However, in this case, an air circulation hole for supplying air to the fuel cell is provided in the surface on which a positive terminal having the same shape as a positive terminal of the dry battery is provided. In this structure, the area around the air electrode is not open. Therefore, deficiency of air may occur, and therefore the output characteristics of the fuel cell may become unstable.

SUMMARY OF THE INVENTION

The present invention has been made in view of the above circumstances, and it is a general purpose of the invention to provide a technology for stabilizing the output power of a power source system provided with a fuel cell.

In order to solve the above problems, one embodiment of the present invention relates to a power source system to be mounted in an electrical device. The power source system includes: a fuel cell which generates electric power by consuming fuel, the fuel cell including an electrolyte membrane, a cathode which is provided on one side of the electrolyte membrane, and an anode which is provided on the other side of the electrolyte membrane; a fuel storage portion which is disposed on the inner side of the anode of the fuel cell and contains the fuel to be supplied to the anode; a container which contains the fuel storage portion and the fuel cell with the cathode disposed on the outer side of the fuel cell; and a case which is provided so as to surround the container. The container has a vent hole which is provided for supplying air to the cathode. Furthermore, a space is provided between the container and the case.

In this embodiment, air is supplied to the cathode facing the inner surface of the container through the vent hole provided in the container. Therefore, when the power source system provided with the fuel cell is mounted in an electrical device, a sufficient space must be provided around the mounted position. In this embodiment, the space for allowing air circulation is provided between the case and the container for containing the fuel cell. Therefore, deficiency of air, which serves as the oxidant necessary for power generation in the fuel cell, does not occur within a short period of time. In this manner, the output power of the power source system provided with the fuel cell can be stabilized.

The case may have a shape adaptable to the electrical device in which the power source system is mounted. Hence, a power source system can be provided which is adaptable to a variety of electrical devices by changing the case.

The power source system may further include: an electric power storage unit which is capable of storing the electric power generated by the fuel cell; and a control unit which controls charging and discharging of the electric power storage unit. The fuel cell may be disposed at one end of the inside of the container, and the electric power storage unit may be disposed at the other end of the inside of the container.

The amount of the heat generated in the fuel cell is large relative to the amount of the heat generated in the electric power storage unit. Since the fuel cell and the electric power storage unit are disposed at the opposite ends, respectively, of the inside of the container, a heat gradient is generated in the space around the container. Hence, air is convected in the space between the container and the case, and therefore the air supply to the air electrode (the cathode) of the fuel cell is facilitated.

The case may have an opening portion which provides communication between the space and the outside of the case. In this manner, air can be taken from the outside through the opening portion. Therefore, power generation in the fuel cell can be stabilized for a long period of time.

The case may have a cylindrical shape, and a plurality of the opening portions may be provided circumferentially around the case. The diffusion of air is facilitated by providing this plurality of opening portions disposed circumferentially around the case. For example, the air present in the gap between the area containing a dry battery and the cylindrical power source system of an embodiment of the present invention is easily taken through the opening portions. Therefore, power generation in the fuel cell can be stabilized for a longer period of time.

An injection hole may be provided which allows the fuel to be injected into the fuel storage portion from the outside of the case through the container. In this manner, the power source system can be refilled with the fuel while mounted in an electrical device. Therefore, the operability of the power source system is improved.

The case may have a cylindrical shape. A plurality of the injection holes may be provided circumferentially around the case. In this manner, even when the circumferential orientation of the power source system mounted in an electrical device is changed in the circumferential direction of the case, any one of the plurality of the injection holes faces a user. Therefore, the fuel is easily injected with the power source system mounted in the electrical device.

The power source system may further include a cover member which is provided so as to be slidable along the periphery of the case and which uncovers the injection holes when covering the opening portion and uncovers the opening portion when covering the injection holes. When the injection holes are uncovered, the opening portion is covered. Hence, power generation in the fuel cell is suppressed in this configuration. Therefore, the fuel can be added more safely through the injection hole, and waste of the fuel can be suppressed. On the other hand, when the opening portion is uncovered, the injection holes are covered. Therefore, the injection of the fuel is restricted during power generation in the fuel cell.

The container may have a gas discharge hole formed in a part of the outer periphery thereof, the gas discharge hole allowing gas generated during power generation in the fuel cell to be discharged from the fuel storage portion. In this manner, the gas, such as carbon dioxide, generated during power generation in the fuel cell can be discharged to the outside through the space between the container and the case. Therefore, instability of output caused by the adhesion of the gas to a portion between the fuel electrode (anode) of the fuel cell and the fuel storage portion can be prevented.

The fuel cell may be spirally disposed inside the container. In this manner, at least a part of the fuel cell comes into contact with the fuel in the fuel storage portion disposed inside the fuel cell irrespective of, for example, the circumferential orientation of the cylindrical case. Hence the output of the power source system can be stabilized.

The power source system may further include a fuel retaining portion provided on the inner side of the anode, the fuel retaining portion being capable of drawing and retaining the fuel. In this manner, even when the fuel in the fuel storage portion is consumed and the amount of the fuel is reduced, the fuel retaining portion can draw the fuel to supply the fuel to the anode. Hence, even when the anode position, which depends on the circumferential orientation of the power source system, is above the fluid level of the fuel, the output of the power source system can be stabilized.

Any suitable combination and replacement of the aforementioned constituting elements may be included within the scope of the invention protected by the patent based on the present patent application.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Hereinafter, with reference to the drawings, preferred embodiments of the present invention will be described in detail. In the following embodiments, a DMFC which is of a polymer electrolyte type is described as an exemplary form of a fuel cell. Moreover, methanol, which is a liquid fuel, is used as an exemplary form of a fuel. Power source systems according to the preferred embodiments can be used as substitutes for dry batteries and secondary batteries used in portable devices such as personal digital assistants, portable music players, electronic dictionaries, and digital cameras and electrical devices such as external chargers for charging cells built in those portable devices. Moreover, the operating time of electrical devices can be extended.

First Embodiment

Figure 1:
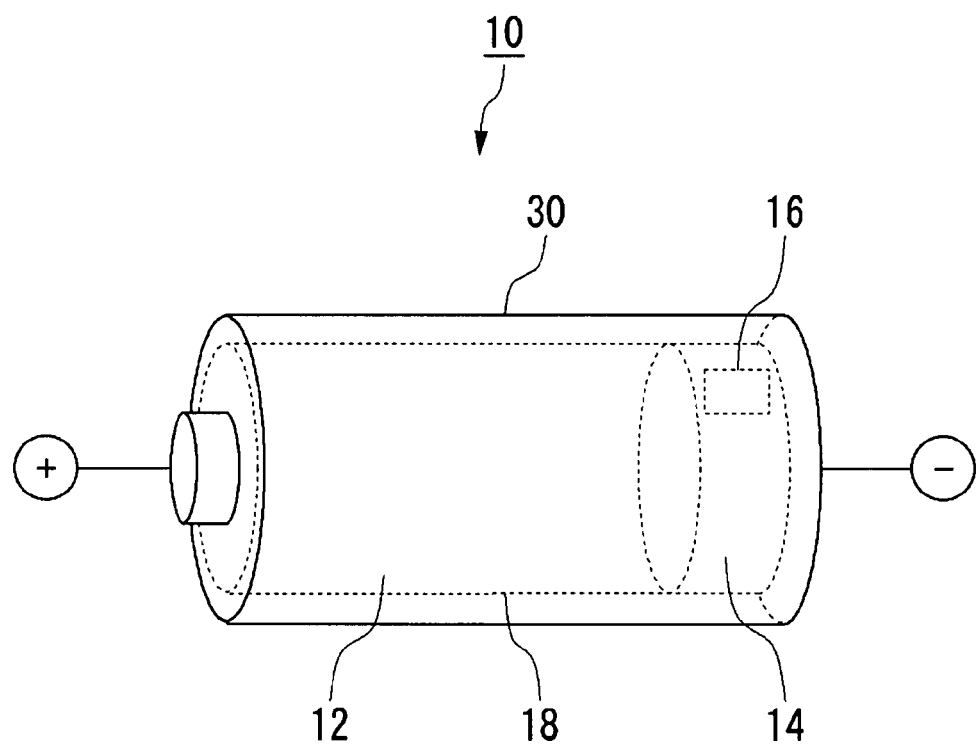
FIG. 1 is a schematic general configuration diagram of a power source system according to a first embodiment.
Figure 2:
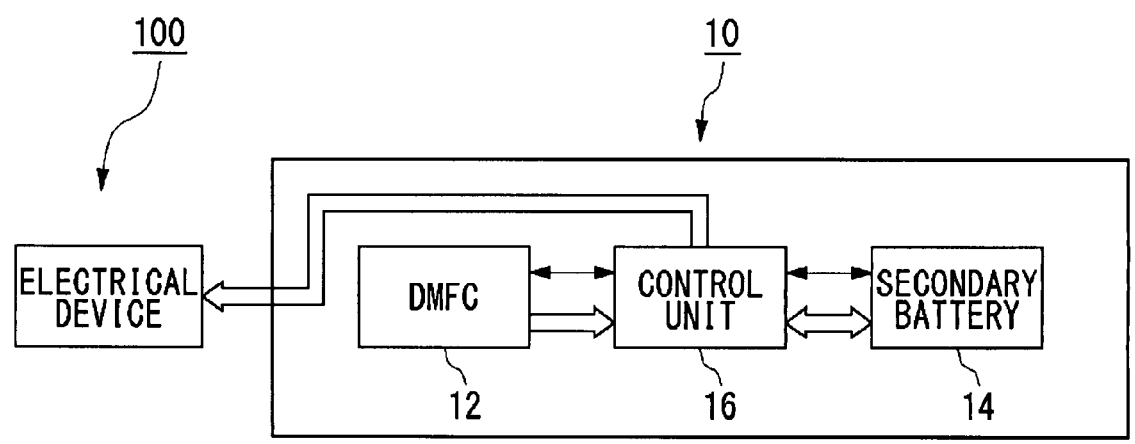
FIG. 2 is a block diagram of the power source system according to the first embodiment.

FIG. 1 is a schematic general configuration diagram of a power source system according to a first embodiment. FIG. 2 is a block diagram of the power source system according to the first embodiment.

A power source system 10 includes: a DMFC 12 which serves as a fuel cell for supplying electric power generated by consuming fuel; a secondary battery 14 which serves as an electric power storage unit capable of storing the electric power generated by the power source system 10; and a control unit 16 which has a charge-discharge circuit for controlling charging and discharging of the secondary battery 14. The control unit 16 also controls power generation in the DMFC 12. Furthermore, the DMFC 12 is contained in a cylindrical container 18. As the secondary battery 14, a rechargeable battery such as a lithium-ion battery, a lithium-ion polymer battery, or a nickel metal hydride battery may be used. The power source system 10 having the above configuration is mounted in an electrical device 100 such as a cellular phone, a notebook personal computer, a personal digital assistant, a portable music player, an electronic dictionary, or a digital camera and supplies power to the electrical device 100. In this case, a projection on the upper surface of the power source system 10 serves as a positive output terminal, and a flat portion of the lower surface of the power source system 10 serves as a negative output terminal.

Figure 3:
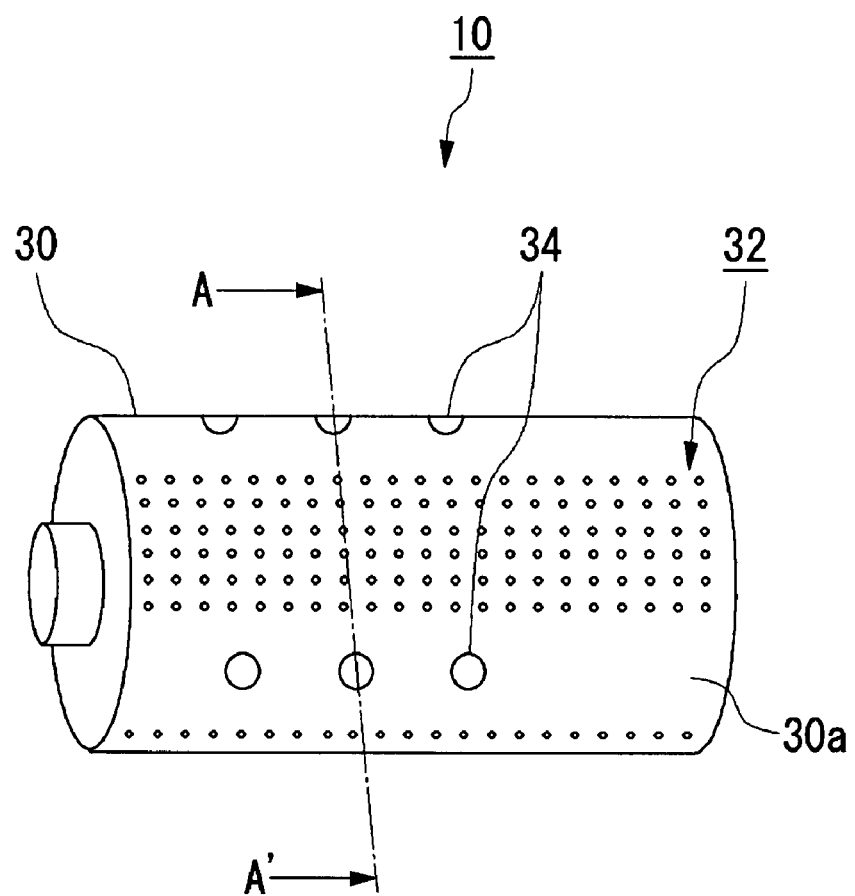
FIG. 3 is a drawing of the exterior of the power source system according to the first embodiment.
Figure 4:
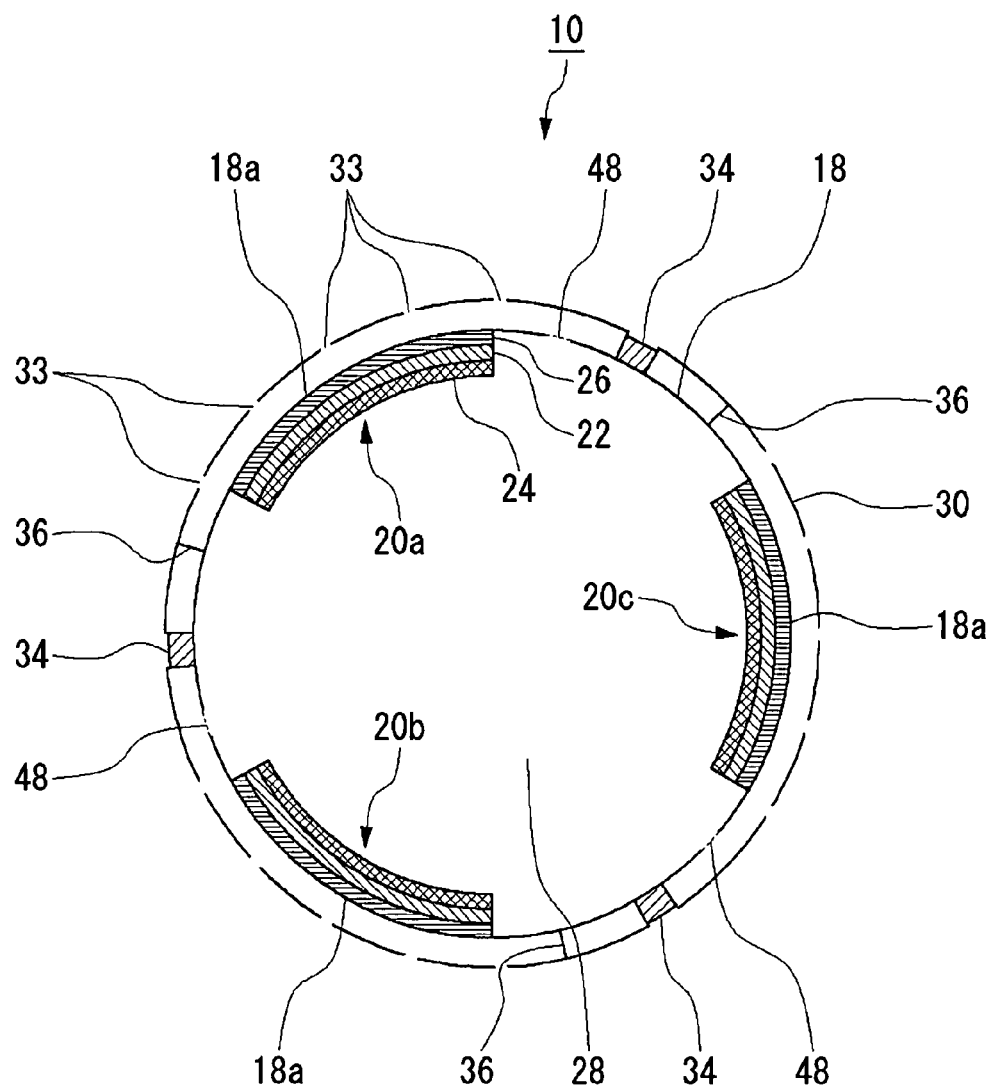
FIG. 4 is a cross-sectional view taken along line A-A' in FIG. 3.

FIG. 3 is a drawing of the exterior of the power source system according to the first embodiment. FIG. 4 is a cross-sectional view taken along line A-A' in FIG. 3.

The DMFC 12 of this embodiment includes three fuel cell units 20a, 20b, and 20c (hereinafter sometimes referred to as "fuel cell units 20"), and the fuel cell units 20 are arranged along the inner periphery of the container 18 at regular intervals. Each of the fuel cell units 20 includes an electrolyte membrane 22, an anode 24 disposed on the inside surface of the electrolyte membrane 22, and a cathode 26 disposed on the outside surface of the electrolyte membrane 22. The cathode 26 is disposed such that a part or the entire part thereof is exposed through a vent hole 18a provided in the outer periphery of the container 18. Air is supplied to the cathode 26 through the vent hole 18a.

As the electrolyte membrane 22 used in the fuel cell units 20, for example, a fluorine-based electrolyte membrane or a hydrocarbon-based electrolyte membrane such as a sulfonated poly(ether ether ketone) electrolyte membrane may be used. In the anode 24, PtRu black is used as a catalyst. In the cathode 26, Pt black is used as a catalyst. In each of the electrodes, a sheet of carbon paper, carbon felt, carbon cloth, a titanium-based alloy, a stainless-based metal, or the like may be used as the base material of the electrode. Moreover, a sheet formed of such a material may be etched to form fine pores, and thereafter a corrosion resistant conductive coating (such as Au or Pt) may be formed thereon.

Inside the container 18 a fuel storage portion 28 is provided in which an aqueous methanol solution or pure methanol (hereinafter referred to as "methanol fuel") serving as liquid fuel is stored and which supplies the methanol fuel to the anode 24. Each of the fuel cell units 20 generates electric power through electrochemical reaction of methanol in the methanol fuel taken from the anode 24 with oxygen in air taken from the cathode 26.

The power source system 10 includes a case 30 which surrounds the container 18. In this embodiment, the case 30 has a cylindrical shape similar to the shape of the container 18. The inner diameter of the case 30 is larger than the outer diameter of the container 18, so that a space is formed between the container 18 and the case 30 so as to allow air used for the reaction in the DMFC 12 to circulate therethrough.

Therefore, when the power source system 10 provided with the DMFC 12 is mounted in the electrical device 100, a space for allowing air to circulate therethrough is provided between the case 30 and the container 18 for containing the DMFC 12 even when a sufficient space is not present around the mounted position of the power source system 10. Hence, deficiency of air serving as oxidant necessary for power generation in the DMFC 12 does not occur within a short period of time. In this manner, the output power of the power source system 10 provided with the DMFC 12 can be stabilized.

Moreover, the case 30 of this embodiment may have a shape adaptable to the particular electrical device 100 in which the power source system 10 is mounted. For example, when the case 30 has a shape corresponding to the exterior shape of a widespread battery such as a D, C, AA, AAA, or N dry battery or a rectangular battery, the power source system 10 of this embodiment can be mounted in an electrical device without any modification to the device. Furthermore, a power source system can be easily provided which is adaptable to a variety of electrical devices by changing the case of the power source system.

As shown in FIG. 1, in the power source system 10 of this embodiment, the DMFC 12 is disposed at one axial end (the left side in the figure) of the inside of the container 18, and the secondary battery 14 is disposed at the other axial end (the right side in the figure) of the inside of the container 18.

In the DMFC 12, heat of reaction is generated during power generation. Therefore, the amount of heat generated in the DMFC 12 is large relative to the amount of heat generated in the secondary battery 14. Since the DMFC 12 and the secondary battery 14 are disposed at opposite ends, respectively, of the inside of the container 18, a heat gradient is generated in the space around the container 18. Hence, air is convected in the space between the container 18 and the case 30, and therefore the air supply to the air electrode (the cathode 26) of the DMFC 12 is facilitated.

In an outer peripheral surface 30a of the case 30, an opening portion 32 is provided for communication between the above-mentioned space and the outside. In this embodiment, the opening portion 32 is composed of a plurality of holes 33 formed at positions facing the fuel cell units 20. Hence, air can be taken from the outside through the opening portion 32. Therefore, power generation in the fuel cell can be stabilized for a long period of time.

Moreover, in the outer peripheral surface 30a of the case 30, an injection hole 34 is provided which allows the fuel to be injected into the fuel storage portion 28 from the outside of the case 30 through the container 18. The injection hole 34 is normally sealed with a sealing material such as an elastic material so as to prevent the methanol fuel from leaking from the container 18. When the fuel storage portion 28 is replenished with the methanol fuel, an injection needle or the like is inserted into the sealing material to feed the methanol fuel into the fuel storage portion 28. After the replenishment of the methanol fuel, the injection needle is pulled out of the injection hole 34. Then, the passage formed by inserting the injection needle disappears due to the restoring force of the sealing material, and thus leakage of the methanol fuel can be prevented. It should be appreciated that a valve structure such as a check valve may be provided in the injection hole 34. In this manner also, leakage of the methanol fuel can be prevented.

By providing the injection hole 34 described above, the power source system 10 can be replenished with the methanol fuel while being mounted in the electrical device 100. Therefore, the operability of the power source system 10 is improved.

Furthermore, a plurality of the injection holes 34 may be provided circumferentially around the outer peripheral surface 30a of the case 30 having a cylindrical shape. In this manner, even when the circumferential orientation of the power source system 10 mounted in the electrical device 100 is changed in the circumferential direction of the case 30, any one of the plurality of injection holes 34 faces a user (the front side along the mounting direction). Therefore, the methanol fuel is easily injected with the power source system 10 mounted in the electrical device 100.

Moreover, a plurality of ribs 36 for securing the container 18 are formed on the inner peripheral surface of the case 30. Hence, even when a force is applied to the case 30 from the outside, the entire power source system 10 resists deformation, and therefore the safety of the power source system 10 is improved.

Figure 5:
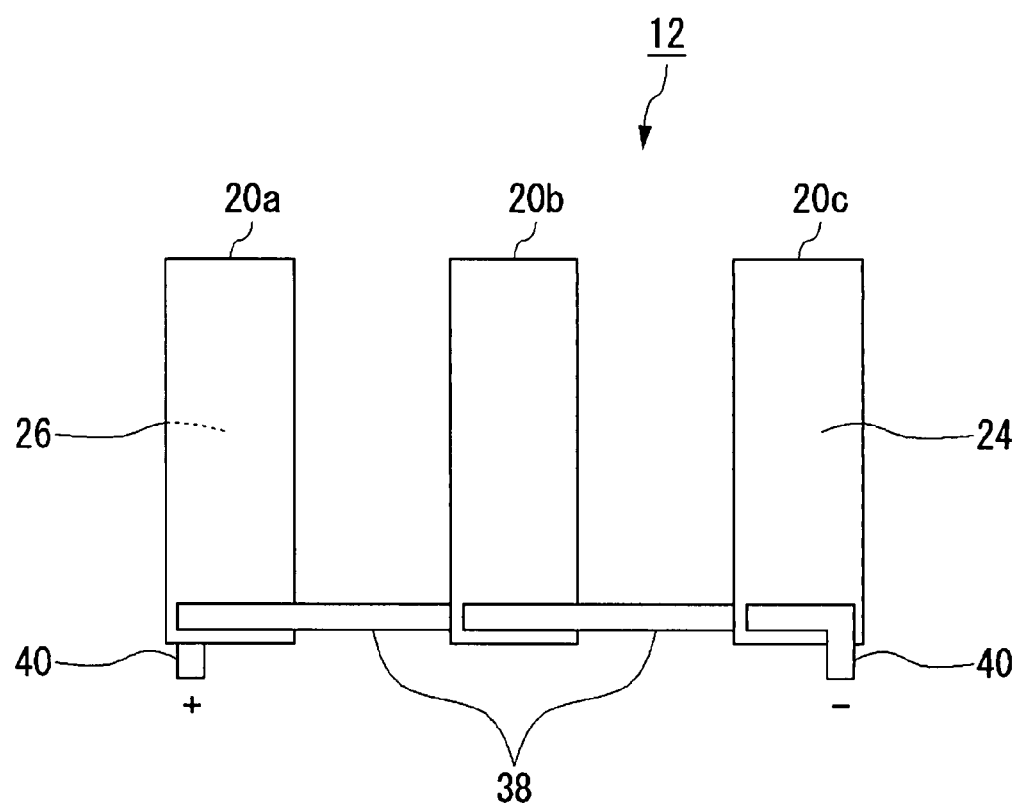
FIG. 5 is a plan view illustrating a connection configuration of a plurality of fuel cell units.
Figure 6:
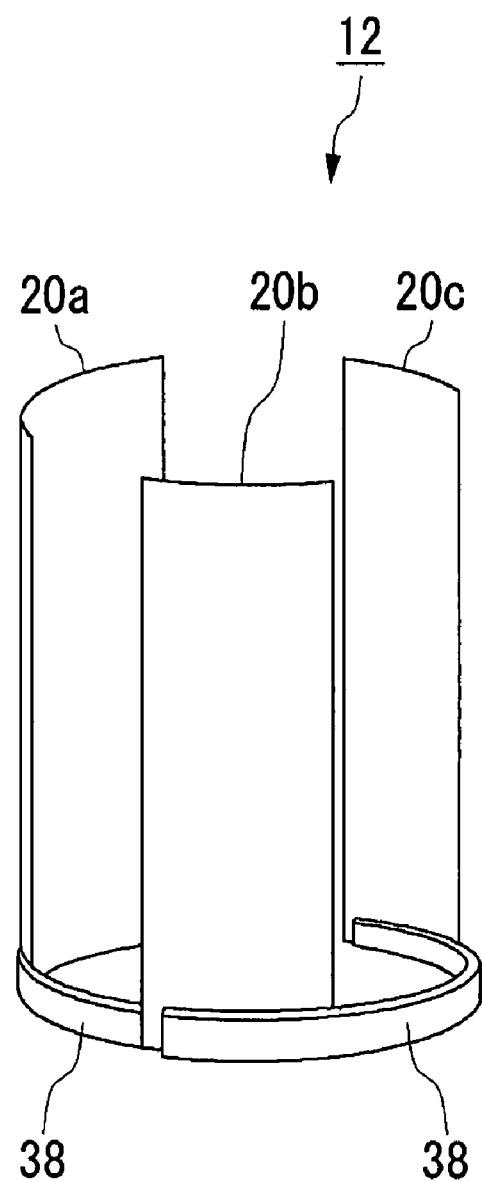
FIG. 6 is a perspective view illustrating the configuration of the plurality of fuel cell units shown in FIG. 5 when they are contained in a container.
Figure 7:
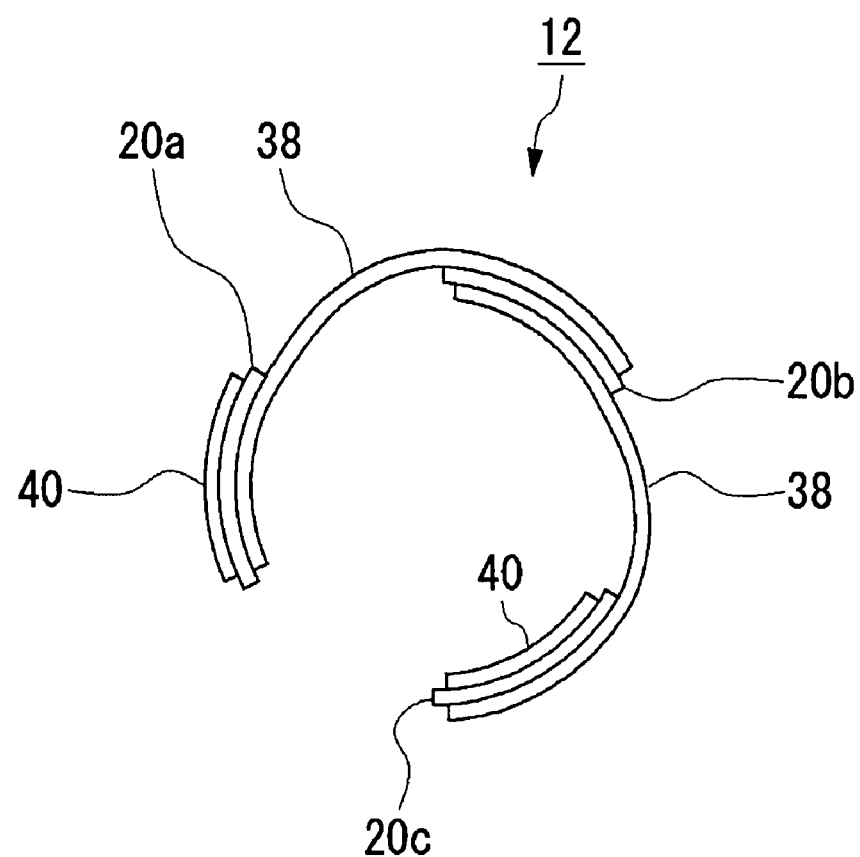
FIG. 7 is a top view illustrating the configuration of the plurality of fuel cell units, as viewed from the top of FIG. 6.

A description will now be given of the connection configuration of the fuel cell units 20 of the DMFC 12 of this embodiment. FIG. 5 is a plan view illustrating the connection configuration of the plurality of fuel cell units 20. FIG. 6 is a perspective view illustrating the shape of the plurality of fuel cell units 20 shown in FIG. 5 when they are contained in the container 18. FIG. 7 is a top view illustrating the configuration of the plurality of fuel cell units 20, as viewed from the top of FIG. 6.

In this embodiment, the fuel cell unit 20b is connected in series to each of the adjacent fuel cell units 20a and 20c through an interconnector 38 made of a metal such as gold or titanium. A collector terminal 40 is provided on each of the fuel cell units 20a and 20c located at the respective ends. Each collector terminal 40 is connected to the control unit 16 shown in FIG. 2. The fuel cell units 20a, 20b, and 20c, the interconnectors 38, and the collector terminals 40 are disposed inside the container 18 so as to be annularly wound as shown in FIGS. 6 and 7.

Desirably, the material forming the three fuel cell units 20 of the DMFC 12 of this embodiment is flexible since the fuel cell units 20 are disposed in a curved shape. Hence, carbon cloth or carbon felt is suitable for the base material for each of the electrodes.

Figure 8:
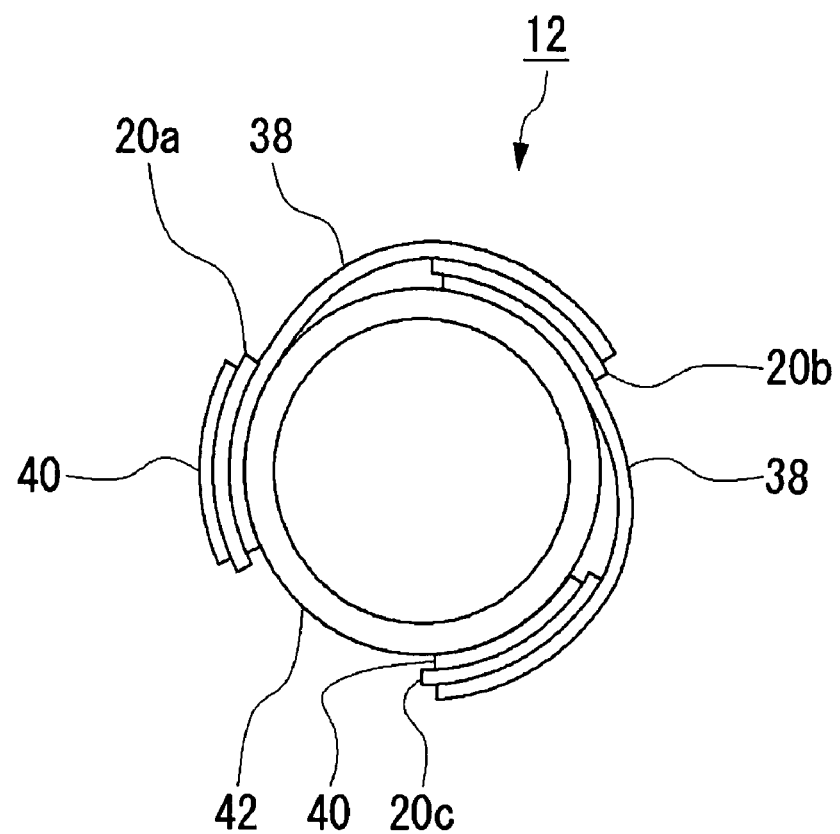
FIG. 8 is a top view illustrating a configuration in which a supporting tube is inserted on the inner side of the plurality of fuel cell units shown in FIG. 7.

Moreover, in order to maintain the shape of the module composed of the three fuel cell units 20, a stiff porous supporting tube may be inserted on the inner side of the interconnectors 38 or the collector terminals 40. FIG. 8 is a top view illustrating a configuration in which a supporting tube 42 is inserted on the inner side of the plurality of fuel cell units 20 shown in FIG. 7. In this manner, the fuel cell units 20a, 20b, and 20c, the interconnectors 38, and the collector terminals 40 are held between the container 18 and the supporting tube 42, and therefore the shape of the module can be maintained.

Preferably, the supporting tube 42 is non-conductive and has corrosion resistance and resistance to organic solvents. For example, the supporting tube 42 is preferably a porous tube of titania or alumina. Preferably, in order to supply the methanol fuel in the fuel storage portion 28 to each of the fuel cell units 20 irrespective of the orientation of the DMFC 12, a large number of holes having a size which can facilitate the absorption of the fuel are formed in the supporting tube 42.

Figure 9:
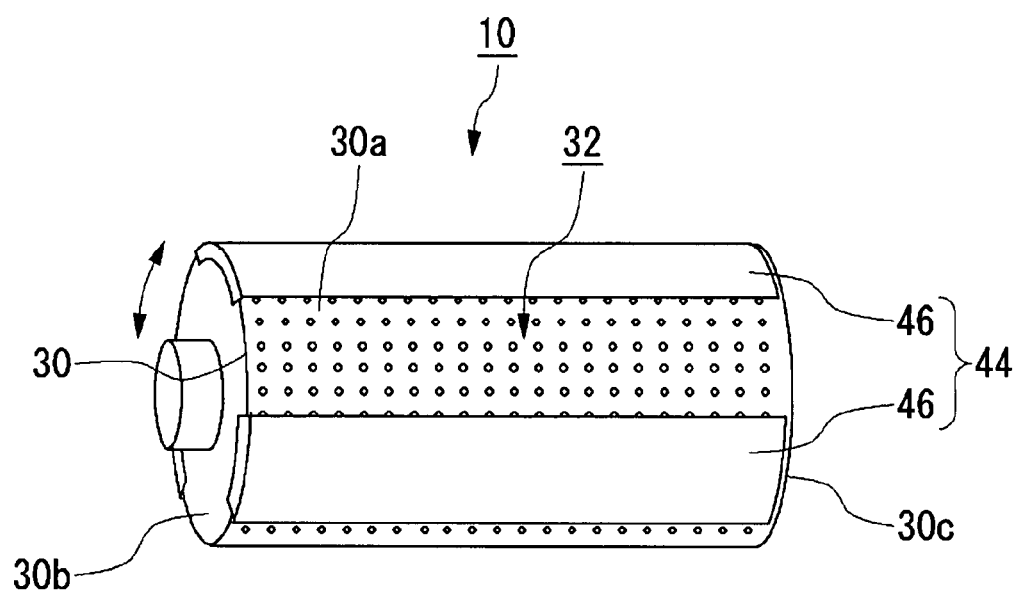
FIG. 9 is a drawing of the exterior of the power source system, illustrating a state in which a cover member covers injection holes.
Figure 10:
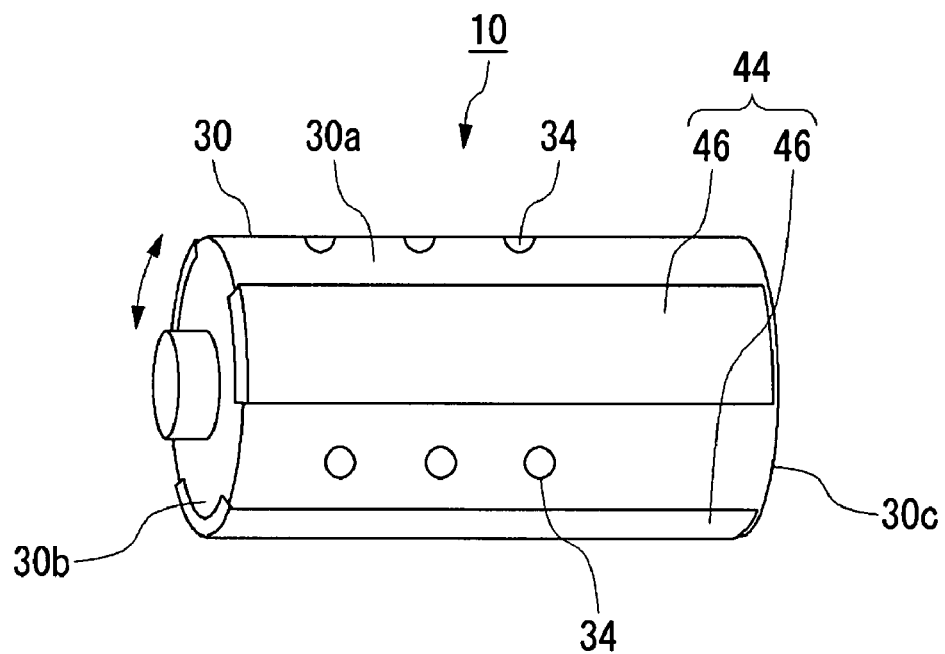
FIG. 10 is a drawing of the exterior of the power source system, illustrating a configuration in which the cover member covers an opening portion.

A description will now be given of a cover member which covers the outer peripheral surface 30a of the case 30. FIG. 9 is a drawing of the exterior of the power source system 10, illustrating a configuration in which the cover member covers the injection holes. FIG. 10 is a drawing of the exterior of the power source system 10, illustrating a configuration in which the cover member covers the opening portion.

As shown in FIGS. 9 and 10, the cover member 44 includes a plurality of plate-like movable members 46. Each of the movable members 46 is a plate-like member curved so as to follow the outer peripheral surface 30a of the case 30 and is slidably engaged with a guide portion (not shown) provided in an upper surface 30b and a lower surface 30c of the case 30. When a user slides the cover member 44 along the outer peripheral surface 30a of the case 30, the injection holes 34 are uncovered when the cover member 44 covers the opening portion 32. Alternatively, the opening portion 32 is uncovered when the cover member 44 covers the injection holes 34.

When the injection holes 34 are uncovered, the opening portion 32 is covered, and therefore air supply to the cathode 26 is suppressed. Hence, the power generation in the DMFC 12 is suppressed, and the methanol fuel can be added more safely through the injection hole 34. Conversely, when the opening portion 32 is uncovered, the injection holes 34 are covered, and therefore the injection of the methanol fuel is restricted during power generation in the DMFC 12. This can prevent a sudden reaction caused by the injection of methanol fuel during power generation, and therefore a stable output can be obtained in the power source system 10.

In the power source system 10 of this embodiment, carbon dioxide generated at the anode 24 of the DMFC 12 is gradually accumulated in the fuel storage portion 28. Hence, in a part of the outer peripheral surface of the container 18 of this embodiment, a gas discharge hole 48 is formed which allows gas, such as carbon dioxide, generated during power generation in the DMFC 12 to be discharged from the fuel storage portion 28 (see FIG. 4). In this manner, the gas, such as carbon dioxide, generated during power generation in the DMFC 12 can be discharged to the outside through the space between the container 18 and the case 30. Therefore, instability of output caused by the adhesion of the gas to a portion between the anode 24 of the DMFC 12 and the fuel storage portion 28 can be prevented. Preferably, a gas-liquid separation filter is provided in the gas discharge hole 48.

Second Embodiment

In the first embodiment, a description has been given of the DMFC 12 in which the plurality of rectangular fuel cell units 20 is formed into a module. In this embodiment, a description is given of a DMFC in which each fuel cell unit has an inclined shape. In the description of the following embodiments, the description of parts similar to those of other embodiments is omitted as appropriate.

Figure 11:
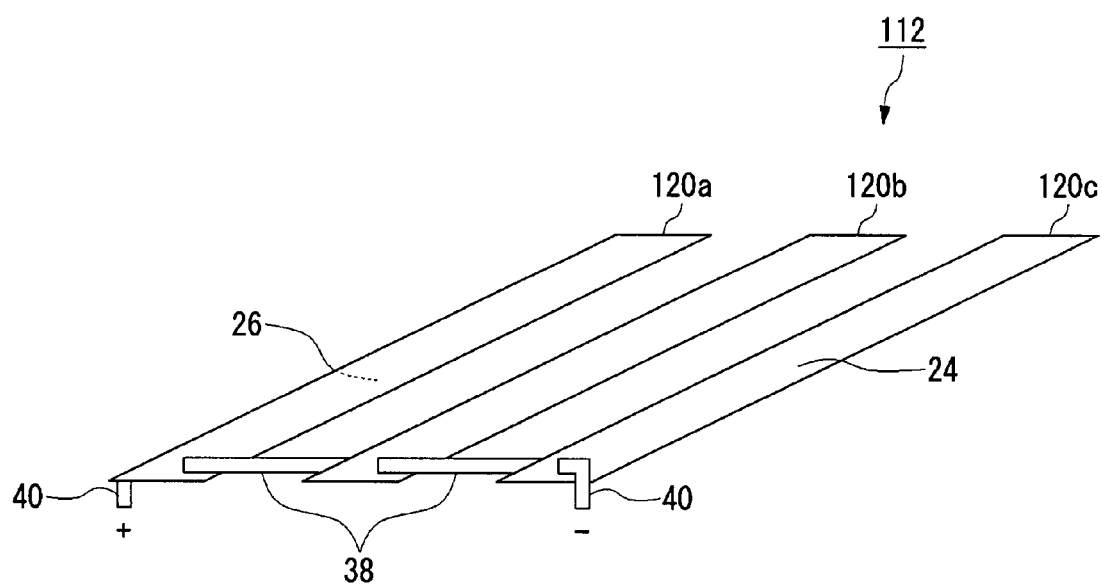
FIG. 11 is a plan view illustrating the connection configuration of a plurality of fuel cell units.
Figure 12:
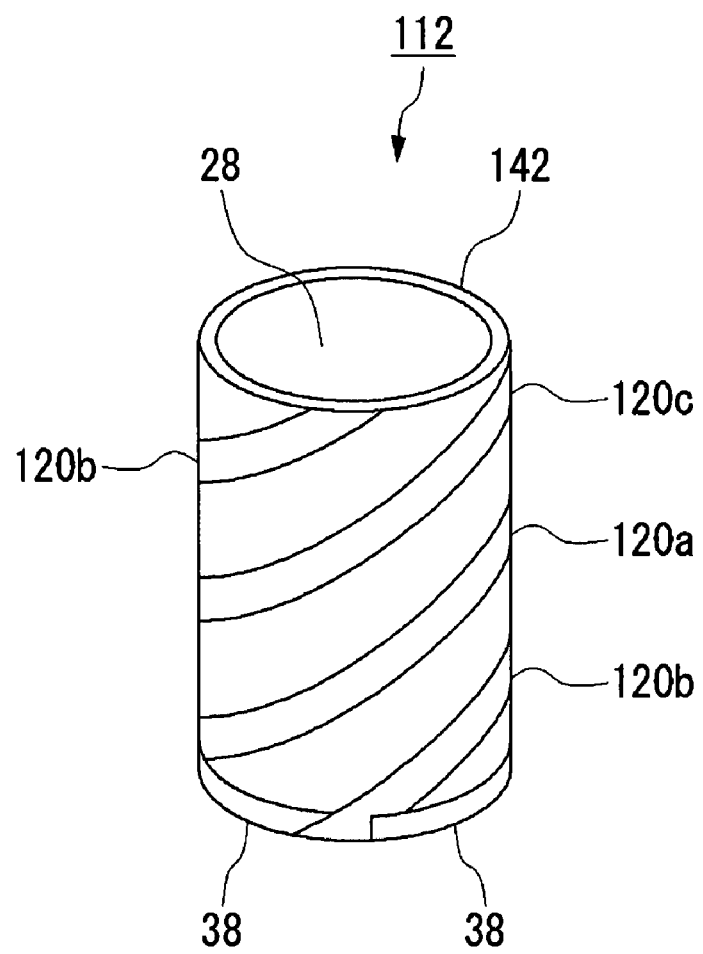
FIG. 12 is a perspective view schematically illustrating the shape of the plurality of fuel cell units shown in FIG. 11 when they are contained in a container.

FIG. 11 is a plan view illustrating the connection configuration of a plurality of fuel cell units 120. FIG. 12 is a perspective view schematically illustrating the shape of the plurality of fuel cell units 120 shown in FIG. 11 when they are contained in the container 18.

A DMFC 112 of this embodiment includes parallelogram-shaped fuel cell units 120a, 120b, and 120c (hereinafter sometimes referred to as "fuel cell units 120") inclined with respect to the axial direction of the container 18 in which the fuel cell units 120 are contained. The fuel cell unit 120b is connected in series to each of the adjacent fuel cell units 120a and 120c through the interconnector 38 made of a metal such as gold or titanium. The collector terminal 40 is provided on each of the fuel cell units 120a and 120c located at the respective ends. Each collector terminal 40 is connected to the control unit 16 shown in FIG. 2. The fuel cell units 120a, 120b, and 120c, the interconnectors 38, and the collector terminals 40 are disposed inside the container 18 so as to be annularly wound around a supporting tube 142, as shown in FIG. 12. Inside the supporting tube 142 the fuel storage portion 28 is provided.

As described above, the fuel cell units 120 constituting the DMFC 112 are spirally disposed inside the container 18, and the fuel storage portion 28 is provided inside the DMFC 112. Therefore, at least a part of each of the fuel cell units 120 comes into contact with the fuel in the fuel storage portion 28 directly or through the supporting tube 142 irrespective of the circumferential orientation of the cylindrical case 30. Hence, the output of the power source system can be stabilized.

Third Embodiment

In the first embodiment, the number of fuel cell units 20 is three, but, of course, a module having any number of fuel cell units can be employed in the power source system. In a power source system of this embodiment, six fuel cell units are annularly disposed in a staggered manner at regular intervals in order to generate a higher voltage and to improve the power generation efficiency.

Figure 13:
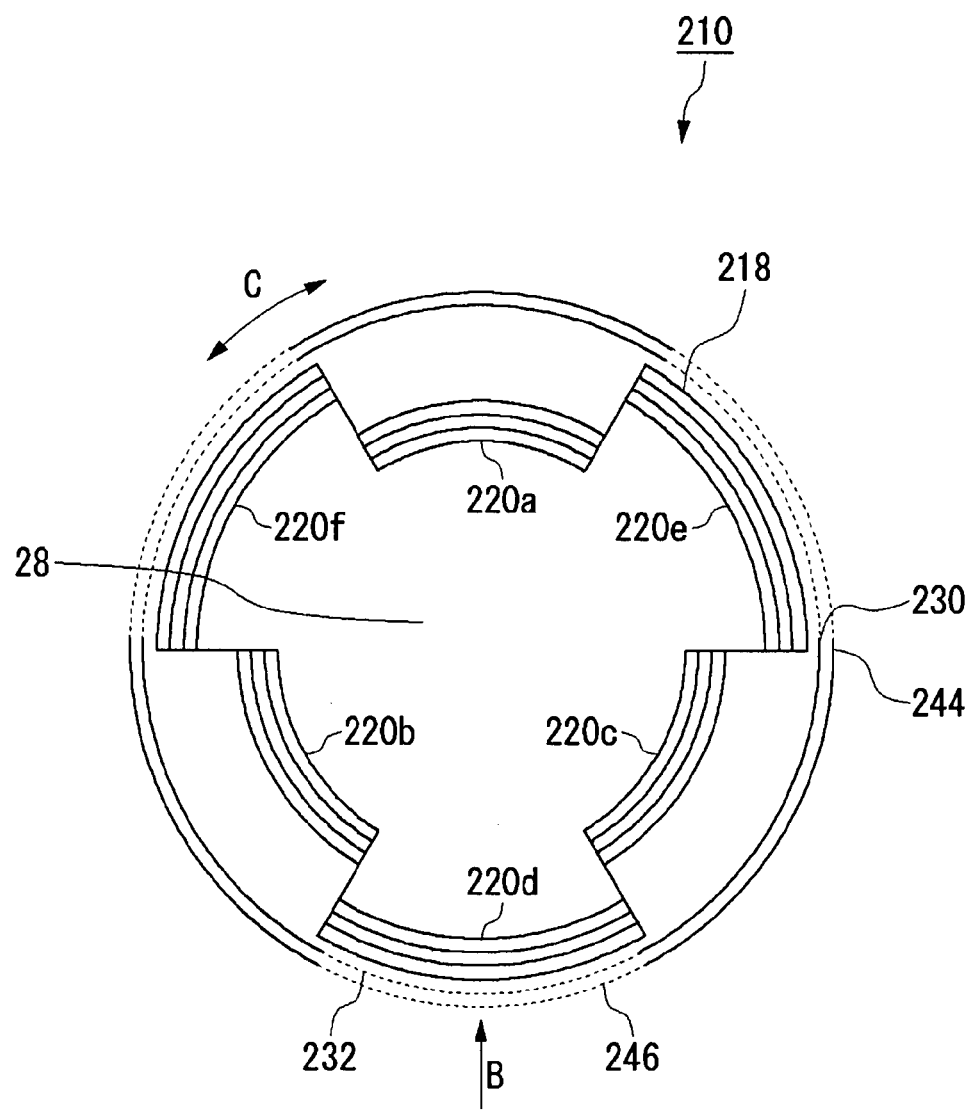
FIG. 13 is a cross-sectional view of the main portion of a power source system according to a third embodiment.
Figure 14:
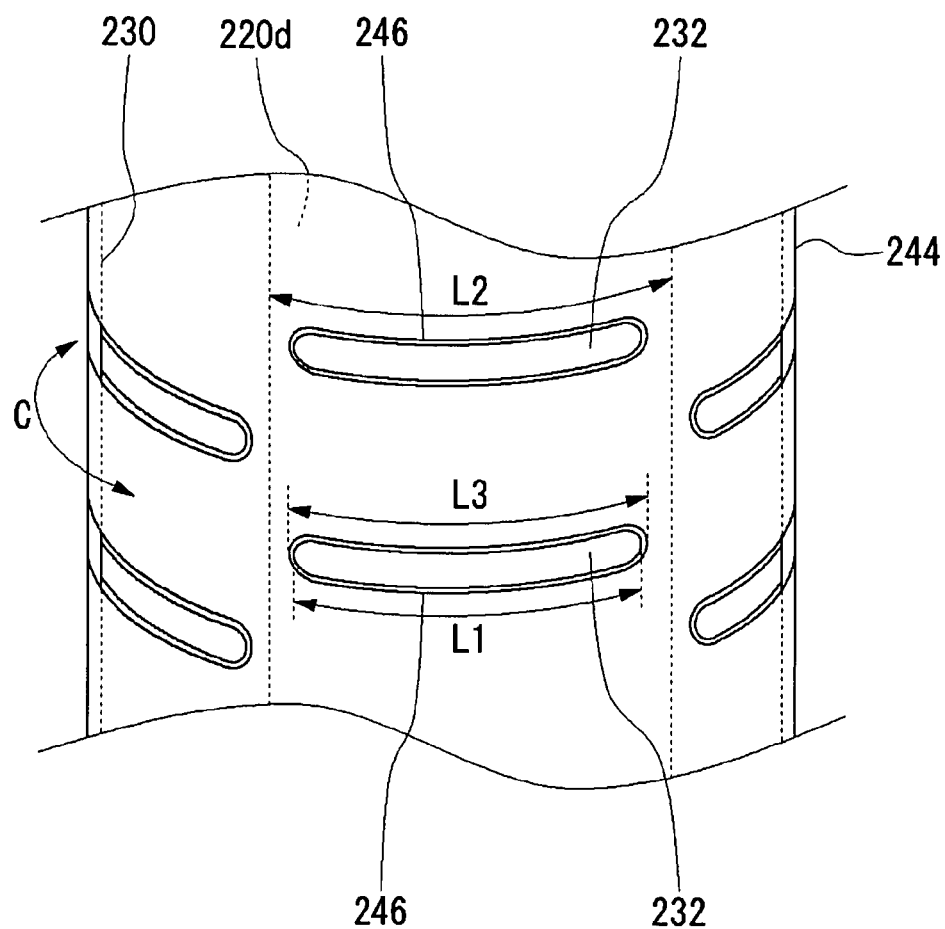
FIG. 14 is a side view of the main portion of the power source system shown in FIG. 13, as viewed from the direction of arrow B.
Figure 15:
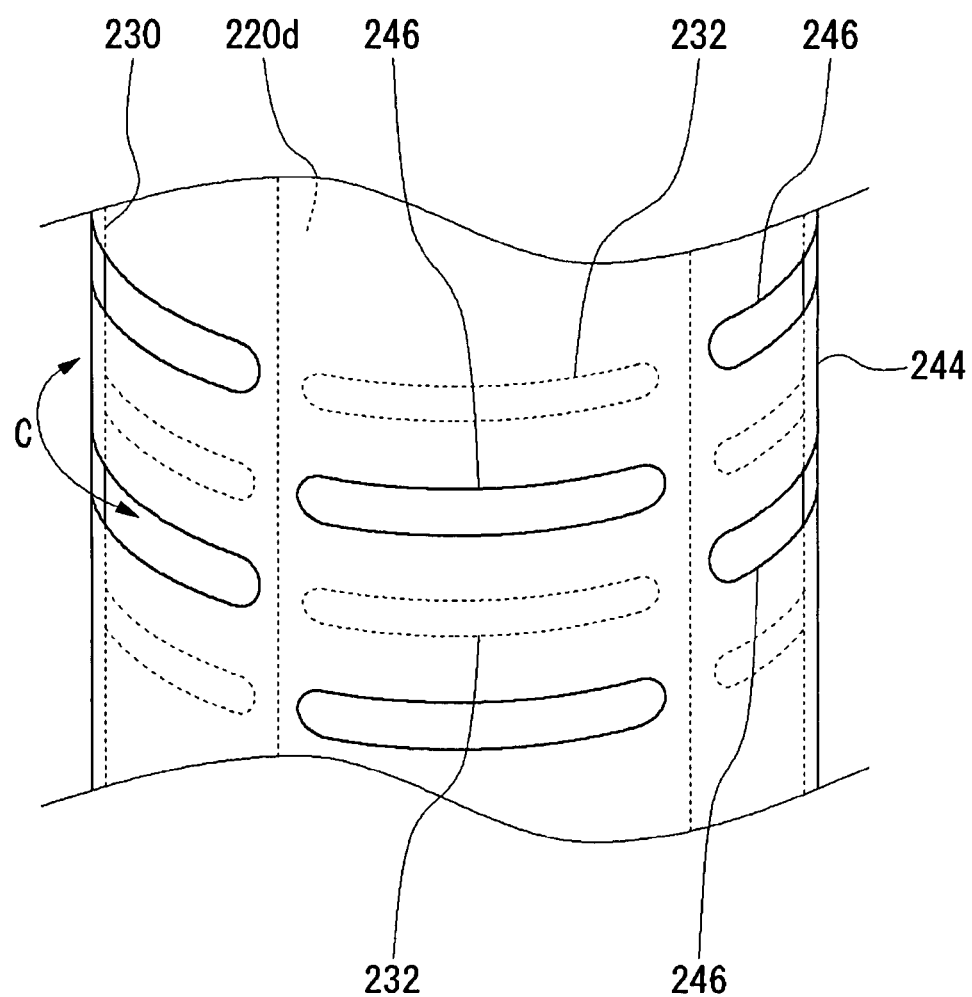
FIG. 15 is a side view of the main portion when a cover member is rotated from the configuration shown in FIG. 14 in the direction of arrow C in FIG. 13.

FIG. 13 is a cross-sectional view of the main portion of the power source system 210 according to the third embodiment. FIG. 14 is a side view of the main portion of the power source system 210 shown in FIG. 13, as viewed from the direction of arrow B. FIG. 15 is a side view of the main portion when a cover member is rotated from the configuration shown in FIG. 14 in the direction of arrow C in FIG. 13.

In a DMFC of this embodiment, six fuel cell units 220a, 220b, 220c, 220d, 220e, and 220f (hereinafter sometimes referred to as "fuel cell units 220") are annularly disposed inside a container 218 in a staggered manner at regular intervals. A case 230 is provided around the container 218 so as to surround the container 218. In the outer periphery of the case 230, a plurality of axially staggered elongated holes 232 are formed, serving as opening portions at regular circumferential intervals as shown in FIG. 14. The length L1 of the elongated holes 232 is less than the circumferential width L2 of the fuel cell units 220.

It should be noted that a cylindrical cover member 244 is provided on the outer periphery of the case 230. The cover member 244 is supported by the case 230 so as to be slidable with respect to the case 230 in the direction of arrow C. As shown in FIG. 14, a plurality of elongated holes 246 are formed in the cover member 244 so as to correspond to the respective elongated holes 232 formed in the case 230. The length L3 of the elongated holes 246 is less than the circumferential width L2 of the fuel cell units 220.

In the configuration shown in FIGS. 13 and 14, since the positions of the elongated holes 246 of the cover member 244 substantially correspond to the respective positions of the elongated holes 232 of the case 230, air can be taken from the outside through the elongated holes 232 and the elongated holes 246. Therefore, power generation in the power generation system 210 can be stabilized for a long period of time.

When power generation in the power generation system 210 is to be suppressed, the cover member 244 is rotated by 60° in the direction of arrow C shown in FIG. 13. Hence, the elongated holes 246 are moved, and the positions of elongated holes 246 are displaced from the respective positions of the elongated holes 232 formed in the case 230. Therefore, the space formed between the container 218 and the case 230 is shielded from the outside. Hence, only an insufficient amount of air is supplied to the cathode provided in the outer periphery of each of the fuel cell units 220, and therefore power generation is suppressed.

The present invention is not limited to the above-described embodiments. Various modifications such as changes in design may be made based on the knowledge of those skilled in the art, and replacement and addition may also be applied to a part of the configuration. Such modified embodiments may fall within the scope of the invention.

For example, a nonwoven fabric serving as a fuel retaining portion may be provided in the above fuel storage portion 28. In this case, the nonwoven fabric may be disposed on the inner surface of the container 18 so as to contact the fuel cell units 20. Polyester may be used as the nonwoven fabric. In this manner, the fuel can be supplied to the surface of the anode serving as the fuel electrode irrespective of the circumferential orientation of the power source system.

Moreover, the fuel storage portion may be a fuel cartridge removable from the container. In this case, the fuel cartridge is inserted from the bottom of the cylindrical power source system. Further, the injection hole for injecting the fuel into the fuel storage portion may be provided in the bottom or upper surface of the cylindrical case or the container. In this manner, a larger number of fuel cell units can be disposed on the inner peripheral side of the container. Therefore, a higher voltage can be obtained, and the efficiency of power generation can be improved.

Preferably, the aforementioned power source system has a shape compatible with two D-sized dry batteries aligned in the axial direction, and the output voltage is adjusted to a level equal to the voltage of two dry batteries connected in series. With this, the power source system can be used in place of dry batteries for an electrical device powered by two D-sized dry batteries. The external terminals are found only at the ends of the power source system so that the number of external terminals is reduced as compared with a case where two dry batteries are used. Associated with this, the volume is efficiently used, and so power generation efficiency per unit volume is improved accordingly.

In the embodiments described above, the use of aqueous methanol solution as a fuel is illustrated. Alternatively, aqueous methanol solution with different methanol concentration may be used. Still alternatively, organic fuel such as ethanol, propanol, butanol, dimethyl ether, trimethoxy methane, ethylene glycol and formic acid, or an organic fuel which is a mixture of any of these may be used. Carbon dioxide, in which hydrogen is a main component, nitrogen, and reformed hydrogen, which contains carbon monoxide, etc., may alternatively be used. Pure hydrogen may alternatively be used. For supply of pure hydrogen, a fuel cartridge may be filled with a hydrogen storage means comprising a hydrogen absorbing alloy, a fullerene, or a carbon nanotube, or may be filled with a material, such as iron and aluminum, which generates hydrogen when water is added.

What is claimed is:

1. A power source system to be mounted in an electrical device, the power source system comprising:
   a fuel cell which generates electric power by consuming fuel, the fuel cell including an electrolyte membrane, a cathode which is provided on one side of the electrolyte membrane, and an anode which is provided on the other side of the electrolyte membrane;

a fuel storage portion which is disposed on the inner side of the anode of the fuel cell and contains the fuel to be supplied to the anode;

a container which contains the fuel storage portion and the fuel cell with the cathode disposed on the outer side of the fuel cell; and a case which is provided so as to surround the container, wherein the container has a vent hole which is provided for supplying air to the cathode, and a space is provided between the container and the case.

2. The power source system according to claim 1, wherein the case has a shape adaptable to the electrical device in which the power source system is mounted.

3. The power source system according to claim 1, further comprising:

an electric power storage unit which is capable of storing the electric power generated by the fuel cell; and a control unit which controls charging and discharging of the electric power storage unit, and wherein the fuel cell is disposed at one end of the inside of the container, and the electric power storage unit is disposed at the other end of the inside of the container.

4. The power source system according to claim 1, wherein the case has an opening portion which provides communication between the space and the outside of the case.

5. The power source system according to claim 4, wherein the case has a cylindrical shape, and a plurality of the opening portions are provided circumferentially around the case.

6. The power source system according to claim 4, wherein an injection hole is provided which allows the fuel to be injected into the fuel storage portion from the outside of the case through the container.

7. The power source system according to claim 5, wherein an injection hole is provided which allows the fuel to be injected into the fuel storage portion from the outside of the case through the container.

8. The power source system according to claim 6, wherein the case has a cylindrical shape, and a plurality of the injection holes is provided circumferentially around the case.

9. The power source system according to claim 8, further comprising a cover member which is provided so as to be slidable along the periphery of the case and which uncovers the injection holes when covering the opening portion and uncovers the opening portion when covering the injection holes.

10. The power source system according to claim 1, wherein the container has a gas discharge hole formed in a part of the outer periphery thereof, the gas discharge hole allowing gas generated during power generation in the fuel cell to be discharged from the fuel storage portion.

11. The power source system according to claim 1, wherein the fuel cell is spirally disposed inside the container.

12. The power source system according to claim 1, further comprising a fuel retaining portion provided on the inner side of the anode, the fuel retaining portion being capable of drawing and retaining the fuel.

13. The power source system according to claim 2, wherein the container has a gas discharge hole formed in a part of the outer periphery thereof, the gas discharge hole allowing gas generated during power generation in the fuel cell to be discharged from the fuel storage portion.

14. The power source system according to claim 2, wherein the fuel cell is spirally disposed inside the container.

15. The power source system according to claim 2, further comprising a fuel retaining portion provided on the inner side of the anode, the fuel retaining portion being capable of drawing and retaining the fuel.

* * * * *